FUNGICIDAL COMPOSITIONS

Wolfgang Reuter, Richard Sehring, and Karl Zeile, all of Ingelheim (Rhine), Germany, assignors to C. H. Boehringer Sohn, Ingelheim (Rhine), Germany, a limited partnership of Germany
No Drawing. Filed May 26, 1961, Ser. No. 112,764
Claims priority, application Germany, May 27, 1960, B 58,020
11 Claims. (Cl. 167—22)

This invention relates to fungicidal compounds, to fungicidal compositions containing such fungicidal compounds as active ingredients, and to a method of combatting fungi with such compounds.

More particularly, the present invention relates to salts of N,N-dialkylhydrazine-N'-dithiocarboxylic acid which may be represented by the formula

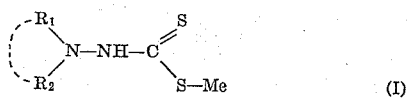
(I)

wherein $R_1$ and $R_2$, which may be identical to or different from each other, are alkyl with 1 to 6 carbon atoms or, together with the nitrogen atom to which they are attached, form a heterocycle such as piperidino or morpholino, and Me is the cation of a monovalent or polyvalent metal, such as sodium, potassium, calcium, zinc, mercury, manganese or iron.

The compounds according to the present invention are conveniently prepared by reacting the corresponding N,N-dialkylhydrazines with carbon disulfide, or with a compound which splits off or yields carbon disulfide under the reaction conditions, in the presence of a basic metal compound, such as an alkali metal hydroxide or alkaline earth metal hydroxide. The reaction is carried out in aqueous solution and advantageously at elevated temperatures of about 40 to 50° C. to yield an aqueous solution of the alkali metal salts or alkaline earth metal salts of the N,N-dialkylhydrazine-N'-dithiocarboxylic acids, that is, of the salts of the Formula I above wherein Me is an alkali metal cation or an alkaline earth metal cation.

To convert these alkali metal or alkaline earth metal salts into the corresponding heavy metal salts, such as the zinc, mercury, manganese or iron salts, the aqueous solutions of the alkali metal or alkaline earth metal salts are admixed with an equimolar or slightly higher amount of a water-soluble salt of the heavy metals, whereby the difficultly soluble heavy metal salts of the N,N-dialkylhydrazine-N'-dithiocarboxylic acid precipitate out.

The salts of the present invention, i.e. the compounds of the Formula I above, have no well defined melting point; upon being heated they decompose without melting at temperatures between 130 and 150° C.

The N,N-dialkylhydrazines used as starting materials in the preparation of the compounds of the present invention, that is, the compounds of the formula

(II)

wherein $R_1$ and $R_2$ have the meanings defined above in connection with Formula I, are prepared by well known methods; for instance, they may readily be obtained by reacting a secondary amine $R_1R_2NH$ with chloroamine (Theilacker and Wegner, Angewandte Chemie, vol. 72 [1960], page 129), or with nitrous acid and subsequent reduction of the reaction product (Org. Synth. Coll., vol. II, page 211).

The following examples illustrate the preparation of a few representative compounds embraced by formula I above. It will be understood, however, that the present invention is not limited solely to the compounds obtained in these illustrative examples.

EXAMPLE I

*Preparation of the sodium salt of N,N-dimethylhydrazine-N'-dithiocarboxylic acid*

60 gm. (1 mol) of N,N-dimethylhydrazine were added to a solution of 40 gm. (1 mol) of sodium hydroxide in 500 cc. of water. Thereafter, while stirring and maintaining the mixture at 40–50° C., 76 gm. (1 mol) of carbon disulfide were added dropwise over a period of eighty minutes. The reaction solution turned yellow and in some instances became cloudy. After all of the $CS_2$ had been added the reaction mixture was heated for another one-half to one hour at 50° C. while stirring. An aqueous solution of N,N-dimethylhydrazine-N'-sodium dithiocarboxylate of the formula

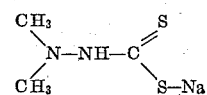

was obtained.

EXAMPLE II

*Preparation of the zinc salt of N,N-dimethylhydrazine-N'-dithiocarboxylic acid*

The solution of N,N-dimethylhydrazine-N'-sodium dithiocarboxylate obtained in Example I was filtered and admixed with a solution of 320 gm. of $ZnSO_4.7H_2O$ (1.1 mols), and resulting mixture was allowed to stand overnight. The light yellow precipitate formed thereby was separated by vacuum filtration, was washed with water until the wash water no longer turned cloudy upon having an aqueous $BaCl_2$ solution added thereto, and was finally dried in vacuo at 50° C. The yield was 158 gm. (94% of theory) of the compound of the formula

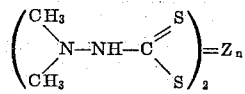

It decomposed without melting upon being heated to above 150° C.

EXAMPLE III

*Preparation of N,N-diethylhydrazine-N'-manganese dithiocarboxylate*

88 gm. (1 mol) of N,N-diethylhydrazine were added to a solution of 40 gm. (1 mol) of sodium hydroxide in 500 cc. of water. Thereafter, while stirring and maintaining the mixture at 40–50° C., 76 gm. (1 mol) of carbon disulfide were added dropwise, whereby the reaction solution turned yellow and in some instances became cloudy. After all of the $CS_2$ had been added the reaction solution was heated for another thirty to sixty minutes at 50° C. while stirring. An aqueous solution of the sodium salt of N,N-diethylhydrazine-N'-dithiocarboxylic acid of the formula

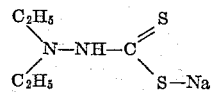

was obtained. This solution was filtered and was admixed with a solution of 255 gm. (1.1 mols) of $MnSO_4.5H_2O$ in 700 cc. of water and the resulting mixture was allowed to stand overnight. A yellow precipitate formed which was separated by vacuum filtration, was washed with water until the wash water no longer turned cloudy upon having an aqueous solution of $BaCl_2$ added thereto, and was finally dried in vacuo at 50° C.

The yield was 171 gm. (90% of theory) of the compound of the formula

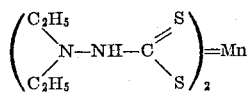

EXAMPLE IV

Using a procedure analogous to that described in Example I, the potassium salt of N,N-dimethylhydrazine-N'-dithiocarboxylic acid of the formula

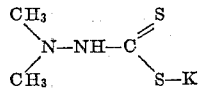

was prepared from N,N-dimethylhydrazine, potassium hydroxide and carbon disulfide.

EXAMPLE V

Using a procedure analogous to that described in Example III, the manganous salt of N,N-dimethylhydrazine-N'-dithiocarboxylic acid of the formula

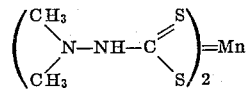

was prepared from an aqueous solution of N,N-dimethylhydrazine-N'-sodium dithiocarboxylate and manganese sulfate.

EXAMPLE VI

Using a procedure analogous to that described in Example III, the ferrous salt of N,N-dimethylhydrazine-N'-dithiocarboxylic acid of the formula

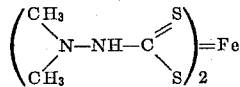

was prepared from an aqueous solution of N,N-dimethylhydrazine-N'-sodium dithiocarboxylate and ferrous sulfate.

EXAMPLE VII

Using a procedure analogous to that described in Example II, the zinc salt of N,N-diethylhydrazine-N'-dithiocarboxylic acid of the formula

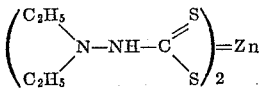

was prepared from an aqueous solution of N,N-diethylhydrazine-N'-sodium dithiocarboxylate and zinc sulfate.

EXAMPLE VIII

Using a procedure analogous to that described in Example II, the zinc salt of N,N-di-n-propylhydrazine-N'-dithiocarboxylic acid of the formula

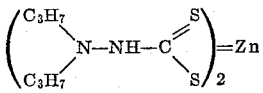

was prepared from an aqueous solution of N,N-di-n-propylhydrazine-N'-sodium dithiocarboxylate and zinc sulfate.

EXAMPLE IX

Using a procedure analogous to that described in Example II, the zinc salt of N-morpholino-dithiocarbamic acid of the formula

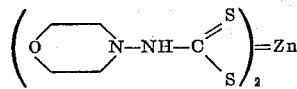

was prepared from an aqueous solution of the sodium salt of N-morpholino-dithiocarbamic acid and zinc sulfate.

EXAMPLE X

Using a procedure analogous to that described in Example II, the zinc salt of N-piperidino-dithiocarbamic acid of the formula

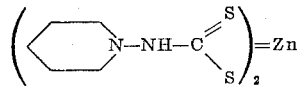

was prepared from an aqueous solution of the sodium salt of N-piperidino-dithiocarbamic acid and zinc sulfate.

All of the salts obtained in the above examples had no definite melting point but rather decomposed without melting upon being heated to temperatures between 130–150° C.

As previously indicated, the compounds according to the present invention are highly effective fungicides, especially for agricultural use, and have been found by practical tests to be particularly effective against Phytophthora and *Tilletia tritici*. They do not impede the germination of wheat and have no phytotoxic effects on tomatoes, lupines and cucumbers.

The novel fungicidal agents of the present invention are preferably applied in aqueous solution (alkali metal or alkaline earth metal salts) or in aqueous suspension (heavy metal salts) or in the form of a dusting powder.

The following examples illustrate a few fungicidal compositions containing the novel compounds of the present invention as active fungicidal ingredients. The parts are parts by weight unless otherwise specified.

EXAMPLE XI

Suspension

The suspension is compounded from the following ingredients:

| | Parts |
|---|---|
| N,N-dimethylhydrazine-N'-zinc-dithiocarboxylic acid | 50 |
| Siliceous chalk | 24 |
| Kaolin | 15 |
| Sodium sulfate | 5 |
| Naphthalene sulfonate | 6 |

These components are admixed with each other and the mixture is milled. Thereafter, the milled mixture is diluted with water to the desired concentration.

EXAMPLE XII

Solution

The aqueous solution of N,N-dimethylhydrazine-N'-sodium-dithiocarboxylate obtained in Example I is diluted with water to the desired concentration.

EXAMPLE XIII

Dusting powder 5 parts of N,N-dimethylhydrazine-N'-manganese-dithiocarboxylate are admixed with 85 parts of kaolin and the mixture is milled.

The preferred concentration of the fungicidal ingredients in the compositions is 0.05 to 10% by weight.

While we have illustrated our invention with the aid of certain specific embodiments thereof, it will be readily apparent to others skilled in the art that the invention is not limited to these embodiments and that various changes and modifications may be made without departing from the spirit of the invention or the scope of the appended claims.

What we claim is:

1. Compounds having a formula selected from the group consisting of

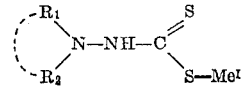

and

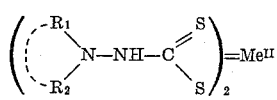

wherein $R_1$ and $R_2$ are selected from the group consisting of alkyl with 1 to 6 carbon atoms and, together with the nitrogen to which they are attached, heterocycles selected from the group consisting of piperidino and morpholino, $Me^I$ is the cation of a monovalent metal and $Me^{II}$ is the cation of a divalent metal.

2. The sodium salt of N,N-dimethylhydrazine-N'-dithiocarboxylic acid.
3. The zinc salt of N,N-dimethylhydrazine-N'-dithiocarboxylic acid.
4. The manganese salt of N,N-diethylhydrazine-N'-dithiocarboxylic acid.
5. The potassium salt of N,N-dimethylhydrazine-N'-dithiocarboxylic acid.
6. The ferrous salt of N,N-dimethylhydrazine-N'-dithiocarboxylic acid.
7. The zinc salt of N,N-diethylhydrazine-N'-dithiocarboxylic acid.
8. The zinc salt of N,N-di-n-propylhydrazine-N'-dithiocarboxylic acid.
9. The zinc salt of N-morpholino-dithiocarbamic acid.
10. The zinc salt of N-piperidino-dithiocarbamic acid.
11. The method of inhibiting fungi, which comprises contacting said fungi with a composition consisting essentially of an inert carrier and 0.05 to 10% by weight of a fungicidally effective compound having a formula selected from the group consisting of

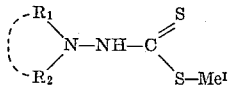

and

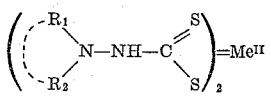

wherein $R_1$ and $R_2$ are selected from the group consisting of alkyl with 1 to 6 carbon atoms and, together with the nitrogen to which they are attached, heterocycles selected from the group consisting of piperidino and morpholino, $Me^I$ is the cation of a monovalent metal and $Me^{II}$ is the cation of a divalent metal.

References Cited by the Examiner

UNITED STATES PATENTS

| | | | |
|---|---|---|---|
| 1,972,961 | 9/34 | Tisdale et al. | 167—22 |
| 2,792,394 | 5/57 | Himel et al. | 167—22 |
| 2,909,556 | 10/59 | Heininger | 167—22 |
| 2,914,547 | 11/59 | Gaertner | 260—500 |
| 3,051,625 | 8/62 | Rao | 167—22 |
| 3,073,694 | 1/63 | Hyson | 167—22 |

FOREIGN PATENTS

| | | |
|---|---|---|
| 201,069 | 12/58 | Austria. |
| 548,257 | 6/56 | Belgium. |
| 562,707 | 5/58 | Belgium. |

OTHER REFERENCES

Audrieth and Ogg: "The Chemistry of Hydrazine," pp. 1–12, 100–102 (Wiley) (1951).

Curtius et al.: Chem. Ber., vol. 27, p. 58 (1894).

Heslop et al.: "Inorganic Chemistry," pages 223–6 (Elsevier) (1960).

Org. Syn. Coll., vol. II, pages 211–13.

Theilacker et al.: "Angewandte Chemie," vol. 72, p. 129 (1960).

WALTER A. MODANCE, *Primary Examiner.*

IRVING MARCUS, *Examiner.*